United States Patent [19]

Taguchi et al.

[11] Patent Number: 4,510,749
[45] Date of Patent: Apr. 16, 1985

[54] EXHAUST GAS PURIFIER FOR A DIESEL ENGINE

[75] Inventors: Masahiro Taguchi, Okazaki; Satosi Kuwakado, Aichi; Noboru Tsuge, Kariya, all of Japan

[73] Assignee: Nippon Soken, Inc., Nishio, Japan

[21] Appl. No.: 438,345

[22] Filed: Nov. 1, 1982

[30] Foreign Application Priority Data

Nov. 5, 1981 [JP] Japan .................... 56-176417

[51] Int. Cl.³ .............................. F01N 3/02
[52] U.S. Cl. ........................ 60/286; 60/288; 60/294; 60/303; 60/311
[58] Field of Search ............... 60/288, 294, 303, 311, 60/286

[56] References Cited

U.S. PATENT DOCUMENTS

| | | | |
|---|---|---|---|
| 4,211,075 | 7/1980 | Ludecke | 60/288 |
| 4,335,574 | 6/1982 | Sato | 60/311 |
| 4,345,431 | 8/1982 | Suzuki | 60/303 |
| 4,381,643 | 5/1983 | Stark | 60/303 |

Primary Examiner—Douglas Hart
Attorney, Agent, or Firm—Cushman, Darby & Cushman

[57] ABSTRACT

An exhaust gas purifier suitable for use in a diesel engine of the type in which the intake air is throttle by a throttle valve provided in an intake passage during engine idling to reduce engine vibration and noise. Unburned combustibles produced by intake air throttling are treated by the exhaust gas purifier having a main passage and a bypass passage in which an oxidation catalyst is received. A bypass control valve, operable in synchronization with the throttle valve, urges the exhaust gas to flow through the bypass passage during engine idling. Preferably, means for preheating the catalyst is provided, which comprises an injector and an igniting glow plug.

4 Claims, 2 Drawing Figures

EXHAUST GAS PURIFIER FOR A DIESEL ENGINE

BACKGROUND OF THE INVENTION

This invention relates to an exhaust gas purifier for automotive engines and, more particularly, to an exhaust gas purifier for a diesel engine of the class wherein a throttle valve is provided in an intake passage for reducing the flow rate of intake air during engine idling.

The vibration and noise produced by a diesel engine are generally of a higher level than those of gasoline engines due to the diesel engine's high compression ratio. Such vibration and noise are disadvantageous in terms of driver and passenger comfort, particularly during engine idling.

In order to reduce engine vibration and noise during idling, there is known in the prior art a diesel engine in which a throttle valve is provided in an intake passage. During engine idling, the throttle valve is closed in response to the release of the accelerator pedal of the vehicle, thereby reducing the amount of the air drawn into the cylinders. With a reduced amount of intake air being compressed at the compression stroke, engine vibration and noise are suppressed to a considerable extent. However, such a diesel engine suffers from the shortcoming that the total amount of unburned hydrocarbon emission is increased due to air throttling.

SUMMARY OF THE INVENTION

An object of the invention is to provide an exhaust gas purifier for a diesel engine of the class wherein a throttle valve is provided in an intake passage for reducing the flow rate of the intake air during engine idling.

Another object of the invention is to provide an exhaust gas purifier for a diesel engine which is simple in construction and easy to manufacture.

A further object of the invention is to provide an exhaust gas purifier which is capable of automatically treating the exhaust gas when the engine is operating at an idle condition.

A still further object of the invention is to provide an exhaust gas purifier which is operable even during the cold start of the engine.

According to the present invention, there is provided an exhaust gas purifier for a diesel engine of the class wherein a throttle valve is provided in an intake passage for reducing the flow rate of intake air during engine idling, the exhaust gas purifier comprising: a housing having an exhaust gas inlet and outlet, the housing having a main passage extending from the inlet to the outlet and a passage bypassing at least part of the main passage; means disposed in said bypass passage for oxidizing the unburned combustibles in the exhaust gas passed therethrough; a control valve arranged in the main passage to close the main passage such that all of the exhaust gas is forced to flow through the bypass passage; and means for closing the control valve in synchronization with the closing movement of the throttle valve.

Preferably, the afore-mentioned means for closing the control valve in synchronization with the closing movement of the throttle valve comprises: a source of partial vacuum; a conduit extending from the source of partial vacuum and terminating in two branched ends; a first vacuum actuator connected to one of the branched ends and linked to the throttle valve to close the throttle valve when the partial vacuum is applied thereon; a second vacuum actuator connected to the other one of the branched ends and linked to the control valve to close the control valve when the partial vacuum is applied thereon; and means responsive to the idling condition of the engine for overriding the partial vacuum in the conduit during non-idling operation of the engine and for connecting the source of partial vacuum to the branched ends during idling to close the control valve simultaneously with the throttle valve.

Advantageously, the oxidizing means comprises an oxidation catalyst and the exhaust gas purifier further comprises means for preheating the oxidation catalyst when the temperature thereof is below a predetermined level. Preferably, the preheating means comprises an injector responsive to the temperature of the catalyst and arranged at the entrance end of the bypass passage for injecting a fuel therein and means disposed adjacent to and downstream of the injector for igniting the injected fuel.

DESCRIPTION OF THE PREFERRED EMBODIMENT

Figure 1:
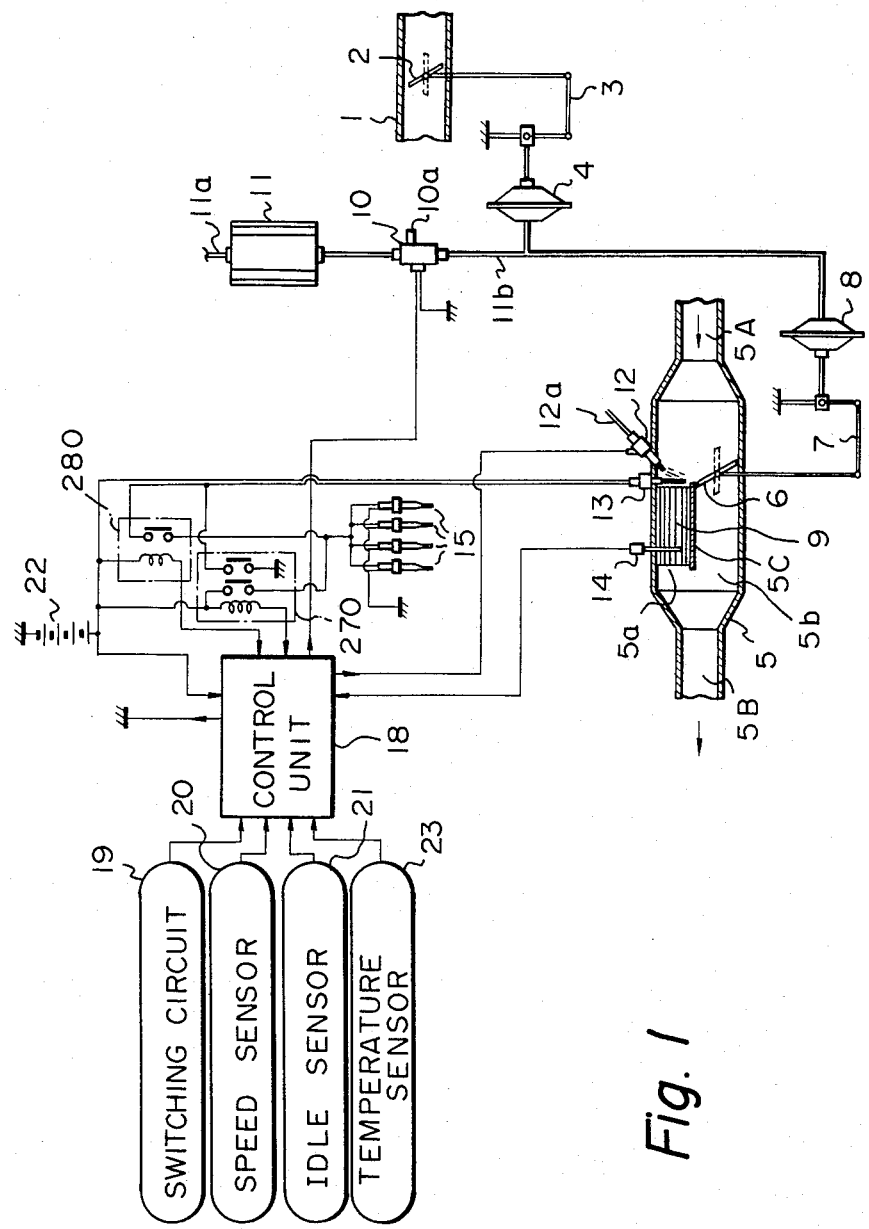
FIG. 1 is a diagramatic view, partly in cross-section, of an embodiment of the exhaust gas purifier according to the invention.

FIG. 1 shows at the right-hand side a section of an intake tube 1 connected between an air cleaner (not shown) and an intake manifold (not shown) of a diesel engine. A throttle valve 2 is mounted in the intake tube 1 for angular rotational movement between a closed position, shown by the solid line, in which the flow rate of the air drawn into the engine is reduced and a full open position, shown by the dotted line, in which the air is drawn without substantial flow resistance. The throttle valve 2 is adapted to be actuated by a vacuum actuator 4 by means of a link 3.

The exhaust gas purifier comprises a roughly tubular housing 5 having a gas inlet 5A and a gas outlet 5B adapted to be connected, respectively, to an exhaust manifold and an exhaust pipe (not shown). The inner cavity of the housing 5 is partially divided by a partition wall 5C into a main passage 5b and a bypass passage 5a. A bypass control valve 6 is provided at the entrance end of the main passage 5b and is adapted to be actuated by a vacuum actuator 8 through a link 7 so that when it is closed all of the exhaust gas flowing into the purifier is forced to pass the bypass passage 5a. The bypass passage 5a is charged with an oxidation catalyst 9, such as platinum coated pellets, known in the art.

Both vacuum actuators 4 and 8 are pneumatically connected by a conduit 11b to a vacuum tank 11 which is in turn connected to a vacuum pump (not shown) of the diesel engine by means of a conduit 11a. The vacuum applied to the vacuum actuators 4 and 8 is controlled by a solenoid-actuated vacuum override valve 10 which selectively connects the vacuum tank 11 to an air bleed port 10a or to vacuum actuators 4 and 8 in response to a signal from a control unit 18.

In order to preheat the oxidation catalyst 9 prior to the operation of the engine, an injector 12 is mounted through the wall of the housing 5 immediately upstream of the entrance aperture of the bypass passage 5a. The injector 12 is connected to a suitable fuel delivery conduit 12a supplying pressurized fuel and is actuated by the control unit 18 to spray a metered amount of fuel toward the gas passing through the bypass passage 5a in response to a control signal from the control unit 18. The sprayed fuel is ignited by a glow plug 13 positioned adjacent to and downstream of the injector 12. A temperature sensor 14 is provided in the bypass passage for sensing the temperature of the catalyst 9 and producing a temperature indicating signal to the control unit 18.

Illustrated schematically by reference numeral 15 are a series of glow plugs for preheating the air in the combustion chambers during cold start of the engine. Each glow plug 15 is mounted operatively in each combustion chamber. The temperature of the glow plugs 15 is sensed by a temperature sensor 23 which outputs a corresponding signal to the control unit 18.

The control unit 18 is supplied with electric power from a source such as a battery 22 and also with various signals from the temperature sensor 14, a switching circuit 19, a vehicle speed sensor 20, an idle sensor 21, and the temperature sensor 23. The control unit 18 issues control signals to glow plugs 13 and 15 through relays 270 and 280 and also controls the vacuum override valve 10 and the injector 12.

Figure 2:
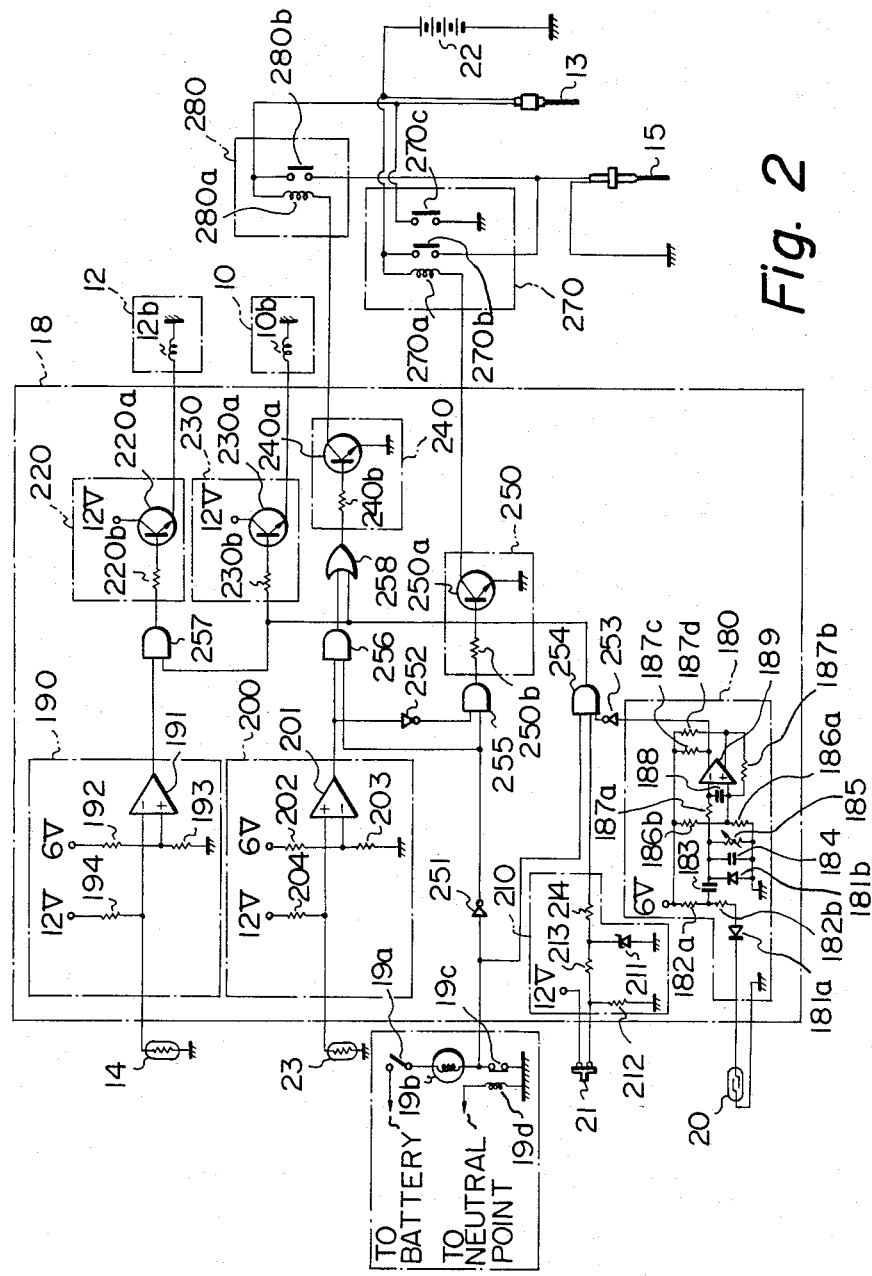
FIG. 2 is a block diagram of the control unit shown in FIG. 1.

Details of the control unit 18 will now be described in conjunction with its associated devices with reference to FIG. 2. Referring first to devices for inputting signals to the control unit 18, the switching circuit 19 comprises a key switch 19a, a charge indicator lamp 19b, and a normally closed relay contact 19c, which are connected in series with each other, and a relay coil 19d which is connected to a neutral point of an alternator of the engine. When the key switch 19a is closed, electric current flows through the charge indicator lamp 19b and the normally closed relay contact 19c to illuminate the lamp 19b. Then, when the engine is put into operation so that the alternator generates an alternating current, a current flows from the neutral point of the alternator to the relay coil 19d to open the contact 19c, turning off the charge indicator lamp 19b.

The vehicle speed sensor 20 is of the reed switch type, as shown, and is adapted to be closed when the vehicle is moving.

The idle sensor 21 is intended to detect the idle position of the accelerator pedal of the vehicle and comprises a switch which is associated with the accelerator pedal and is closed when the pedal is stepped on.

The temperature sensors 14 and 23 are composed of thermisters, the resistance of which varies in response to the temperature of the catalyst 9 and glow plugs 15, respectively.

Referring to the control unit 18 itself, indicated generally at 180 is a vehicle speed detecting circuit for detecting vehicle speeds exceeding a predetermined value. The speed detecting circuit 180 comprises diodes 181a and 181b; resistors 182a, 182b, 185, 186a, 186b, 187a, 187b, 187c, and 187d; capacitors 183, 184, and 188; and a comparator 189. The comparator 189 issues a "0" level signal to an inverter 253 when the vehicle speed is zero and issues a "1" level signal when the vehicle is running.

Indicated generally at 190 is a temperature detecting circuit for detecting the temperature of the catalyst 9. The detecting circuit 190 comprises a comparator 191 and resistors 192, 193, and 194. The comparator 191 issues a "0" level signal to the input terminal of an AND gate 257 when the temperature of the catalyst 9 exceeds a predetermined value.

Reference numeral 200 indicates a temperature detecting circuit for the glow plugs 15 and comprises a comparator 201 and resistors 202, 203, and 204. The comparator 201 issues a "1" level signal to an AND gate 256 and an inverter 252 when the temperature of the glow plugs 15 exceeds a predetermined value.

Reference numeral 210 indicates a detecting circuit for detecting the idle position of the accelerator pedal and comprises a Zener diode 211 and resistors 212, 213, and 214. When the accelerator pedal is stepped on, the idle position detecting circuit 210 inverts a "1" level signal into a "0" level signal which is fed to one of the input terminals of the AND gate 254.

Reference numeral 220 indicates an injector driving circuit for feeding electric current to a solenoid 12b of the injector 12 and comprises a transistor 220a and a resistor 220b.

Reference numeral 230 indicates a driving circuit for the vacuum override valve 10 and comprises a transistor 230a and a resistor 230b. The valve driving circuit 230 supplies an electric current to a solenoid 10b of the vacuum override valve 10.

Reference numeral 240 indicates a driving circuit for controlling the electric current flowing through a coil 280a for actuating a normally open contact 280b of the relay 280. The relay driving circuit 240 comprises a resistor 240b and a transistor 240a, the collector of which is connected to the relay coil 280a. As described hereinafter, the glow plugs 13 and 15 are connected in series to the battery 22 when the normally open contact 280b of the relay 280 is closed, because normally open contacts 270b and 270c of the relay 270 are then open.

Reference numeral 250 indicates a driving circuit for controlling the electric current flowing through a coil 270a for actuating the normally open contacts 270b and 270c of the relay 270. The relay driving circuit 250 comprises a resistor 250b and a transistor 250a, the collector of which is connected to the relay coil 270a. The glow plugs 13 and 15 will be connected in parallel to the battery 22 when the relay contacts 270b and 270c are closed, because the normally open contact 280b is then open.

Indicated by 251, 252, and 253 are inverters, by 254, 255, 256, and 257 AND gates, and by 258 an OR gate.

The operation of the exhaust gas purifier according to the invention is as follows. When the key switch 19a is closed but the engine is not operating, there is no current from the alternator, so that the relay coil 19d is not energized. The electric current from the battery flows through the charge indicator lamp 19b and the normally closed contact 19c to illuminate the charge indicator lamp 19b. The switching circuit 19 produces a "0" level signal which is input into the inverter 251 and the AND gate 254. The signal entered into the inverter 251 is inverted to a "1" level signal and is fed to the AND gates 255 and 256.

As at this stage, the glow plugs 15 are not heated and, thus, the temperature thereof is below the predetermined temperature, the temperature detecting circuit 200 issues a "0" level signal which is applied to the other input terminal of the AND gate 256, so that the output signal of the AND gate 256 is of a "0" level. This "0" level signal is inverted by the inverter 252 into a "1" level signal which is fed to the other input terminal of the AND gate 255, so that the AND gate 255 outputs a "1" level signal to turn on the transistor 250a of the driving circuit 250. As a result, an electric current flows through the relay coil 270a whereby the normally open relay contacts 270b and 270c are closed. As described hereinafter, since the normally open contact 280b of the relay 280 remains open at this stage, the glow plug 13 and the glow plugs 15 are connected in parallel to the battery so that they are heated quickly.

When the engine is not operating with the key switch 19a closed, the accelerator pedal normally will not be stepped on and the vehicle speed will naturally be zero, so that the idle detecting circuit 210 issues a "1" level signal and the speed detecting circuit 180 outputs a "0" level signal. However, as the output signal from the switching circuit 19 is of the "0" level, as described above, the AND gate 254 issues a "0" level signal which is input into the OR gate 258 and the AND gate 257.

As both signals applied to the two input terminals of the OR gate 258 are of the "0" level, the OR gate 258 produces a "0" level signal so that the transistor 240a of the driving circuit 240 is turned off. Thus, no current flows through the relay coil 280a, so that the contact 280b remains open.

The "0" level output signal from the AND gate 254 is also fed to the driving circuit 230 so that the transistor 230a is turned off to de-energize the solenoid coil 10b of the vacuum override valve 10, whereby the latter remains inactivated. As a result, the air is bled from the bleed port 10a into the vacuum chambers of vacuum actuators 4 and 8, so that the throttle valve 2 and the control valve 6 assume the full open position as shown by the dotted line in FIG. 1.

At this moment, the temperature of the catalyst 9 is below the predetermined value, so the temperaure detecting circuit 190 issues a "1" level signal to one of the input terminals of the AND gate 257. However, the signal from the AND gate 254 applied to the other input terminal of the AND gate 257 is of the "0" level, so the AND gate 257 outputs a "0" level signal. Thus, the transistor 220a of the driving circuit 220 is turned off, whereby the injector 12 remains inoperative.

As mentioned above, when the key switch 19 is closed, electric current flows to the glow plug 13 as well as to glow plugs 15. After a lapse of a few seconds, the glow plugs 15 will be heated so that the diesel engine is ready for start. By turning on the starter, the engine then begins running.

After the engine starts, it drives the alternator to generate electric current. As a result, the potential at the neutral point of the alternator is applied on the relay coil 19d causing its contact 19c is open. Thus, the charge indicator lamp 19b is turned off, indicating to the driver that the engine is operating, and the output signal from the switching circuit 19 shifts from the "0" level to the "1" level.

As a result, the output signal from the AND gate 254 changes from the "0" to "1" level, and the transistor 220a of the injector driving circuit 220 and the transistor 230a of the vacuum override valve driving circuit 230 are turned on. Thus, both the solenoid 10b of the vacuum override valve 10 and the solenoid 12b of the injector 12 are energized.

On actuation of the valve 10, the partial vacuum from the vacuum tank is applied to the vacuum actuators 4 and 8 causing them to actuate the throttle valve 2 and control valve 6, respectively, to close as shown by the solid lines in FIG. 1. Thus, the air through the intake passage 1 is throttled and the main passage 5b is closed to force the exhaust gas to flow through the bypass passage 5a, in which the oxidation catalyst is provided.

Simultaneously, the injector 12 sprays a fuel. The fuel is ignited by the then adequately heated glow plug 13 to burn upstream of the catalyst 9 and preheat the same. When the catalyst 9 becomes heated above a predetermined temperature, the output signal from the temperature detecting circuit 190 changes from the "1" to "0" level, so that the transistor 220a of the injector driving circuit 220 is turned off and the injector 12 is closed. This maintains the temperature of the catalyst 9 at a predetermined level.

In this manner, the intake air is throttled during idling operation of the engine, thereby reducing engine vibration and noise, while the exhaust gas is treated by the oxidation catalyst to reduce exhaust emissions.

When the engine is operating and the signal from the switching circuit 19 changes from the "0" to "1" level as described above, the output signal from the AND gate 255 in turn changes from the "1" to "0" level, causing the relay contacts 270b and 270c to return to their normally open position. Since at this moment the output signal from the AND gate 254 is of the "1" level, the OR gate 258 generates a "1" level signal, whereby the normally open contact 280b is closed. As a result, the former parallel connection of the glow plug 13 with the glow plugs 15 is changed to a series connection, so the glow plugs 15 are heated in an after-glow mode.

If the glow plugs 15 are adequately heated prior to engine start, so that their temperature exceeds a predetermined value, the output signal from the detecting circuit 200 will change from the "0" to "1" level, so that the AND gate 255 issues a "0" level signal and the AND gate 256 issues a "1" level signal. This causes the parallel connection of the glow plug 13 with the glow plugs 15 to change to a series connection, thereby ensuring after-glow of the glow plugs 15.

As the vehicle begins to move with the accelerator pedal stepped on, the output signals from the speed detecting circuit 180 and idle detecting circuit 210 will be inverted so that the output signal from the AND gate 254 changes from the "1" to "0" level. Thus, the transistors 220a, 230a, and 240a are turned off, so the engine will be operated as normal with the after-glow of glow plugs 15 stopped, with the throttle valve 2 open, and with the injector 12 closed.

While in the foregoing, the present invention has been described with reference a specific embodiment thereof, it should be understood that the present invention is not limited thereby and that changes and modifications may be made without departing from the spirit or scope of the appended claims.

We claim:

1. An exhaust gas purifier for a diesel engine having a throttle valve provided in an intake passage for reducing the flow rate of intake air during engine idling, said exhaust gas purifier comprising:

a housing having an exhaust gas inlet and outlet, said housing having a main passage extending from said inlet to said outlet and a passage bypassing at least part of said main passage;

means disposed in said bypass passage for oxidizing unburned combustibles in the exhaust gas passed therethrough;

a control valve arranged in said main passage to close said main passage such that all of the exhaust gas is forced to flow through said bypass passage; and means for closing said control valve in synchronization with a closure of said throttle valve during engine idling.

2. An exhaust gas purifier for a diesel engine having a throttle valve provided in an intake passage for reducing the flow rate of intake air during engine idling, said exhaust gas purifier comprising:
- a housing having an exhaust gas inlet and outlet, said housing having a main passage extending from said inlet to said outlet and a passage bypassing at least part of said main passage;
- means disposed in said bypass passage for oxidizing unburned combustibles in the exhaust gas passed therethrough;
- a control valve arranged in said main passage to close said main passage such that all of the exhaust gas is forced to flow through said bypass passage; and
- means for closing said control valve in synchronization with a closing movement of said throttle valve, comprising:
  - a source of partial vacuum,
  - a conduit extending from said source of partial vacuum and terminating in two branched ends,
  - a first vacuum actuator connected to one of said branched ends and linked to said throttle valve to close said throttle valve when the partial vacuum is applied thereon,
  - a second vacuum actuator connected to the other one of said branched ends and linked to said control valve to close said control valve when the partial vacuum is applied thereon, and
  - means responsive to the idling condition of the engine for overriding the partial vacuum in said conduit during non-idling operation of the engine and for connecting said partial vacuum source to said branched ends during idling to close the control valve simultaneously with the throttle valve.

3. An exhaust gas purifier according to claim 2, wherein said oxidizing means comprises an oxidation catalyst and wherein said exhaust gas purifier further comprises means for preheating said oxidation catalyst when the temperature of the catalyst is below a predetermined level.

4. An exhaust gas purifier according to claim 3, wherein said preheating means comprises an injector responsive to the temperature of the catalyst and arranged at the entrance end of said bypass passage for injecting a fuel therein and means disposed adjacent to and downstream of said injector for igniting the injected fuel.

* * * * *